United States Patent [19]
von Hiddessen et al.

[11] Patent Number: 4,543,853
[45] Date of Patent: Oct. 1, 1985

[54] MOUNTING OF A DIFFERENTIAL GEAR IN AN UNDIVIDED AXLE HOUSING

[75] Inventors: Götz von Hiddessen, Uhingen; Dieter Wachtel, Korb, both of Fed. Rep. of Germany

[73] Assignee: Daimler-Benz Aktiengesellschaft, Fed. Rep. of Germany

[21] Appl. No.: 383,943

[22] Filed: Jun. 1, 1982

Related U.S. Application Data

[63] Continuation of Ser. No. 826,840, Aug. 22, 1977, abandoned.

[30] Foreign Application Priority Data

Aug. 31, 1976 [DE] Fed. Rep. of Germany ....... 2639150

[51] Int. Cl.$^4$ .............................................. F16H 1/40
[52] U.S. Cl. ......................................... 74/713; 74/607
[58] Field of Search ........................ 74/607, 710, 713; 29/252, 229

[56] References Cited

U.S. PATENT DOCUMENTS

| | | | |
|---|---|---|---|
| 1,230,450 | 6/1917 | Vincent | 74/607 |
| 1,391,294 | 9/1921 | Barbarou | 74/607 |
| 1,751,453 | 3/1930 | Beemer | 308/DIG. 11 |
| 1,944,612 | 1/1934 | Repeck | 74/713 |
| 2,016,343 | 10/1935 | Oberem | 74/713 |
| 2,529,392 | 11/1950 | Herreshoff | 74/713 |
| 2,561,335 | 7/1951 | Buckendale | 74/713 |
| 2,651,216 | 9/1953 | Alden | 74/713 |
| 2,959,258 | 11/1960 | Hagemann | 29/252 |
| 3,038,247 | 6/1962 | Clark | 29/252 |
| 3,198,036 | 8/1965 | Muller | 74/710 |
| 3,202,466 | 8/1965 | Kaptur | 74/713 |
| 3,875,646 | 4/1975 | Pfeiffer | 29/434 X |

FOREIGN PATENT DOCUMENTS 633317 1/1928 France .................................... 74/713

Primary Examiner—Allan D. Herrmann
Assistant Examiner—Joseph M. Rolnicki
Attorney, Agent, or Firm—Craig and Burns

[57] ABSTRACT

A bearing support of a differential gear in an undivided axis housing with two substantially coaxial roller bearings arranged at approximately the same distance to and on different sides of the plane of the axes of rotation of differential bevel gears; each of the roller bearings supports a bearing neck of the differential gear housing within a bearing opening of the axle housing, whereby at least one of the roller bearings includes an outer race which is inserted directly into its bearing opening and is enlarged in its outer diameter, with respect to the corresponding standard diameter.

7 Claims, 12 Drawing Figures

MOUNTING OF A DIFFERENTIAL GEAR IN AN UNDIVIDED AXLE HOUSING

This is a continuation of application Ser. No. 826,840, filed Aug. 22, 1977, now abandoned.

The present invention relates to a bearing support of a differential gear in an undivided axle housing with two coaxial roller bearings arranged at approximately the same distance relative to the plane of the axes of rotation of the differential bevel gears as well as on different sides of this plane, of which each supports a bearing neck of the differential gear housing in a bearing opening of the axle housing.

With such bearing supports, it is customary to insert into the bearing opening of the axle housing one bearing sleeve each provided with a fastening flange, which receives the outer race of the respective roller bearing. With these prior art bearing supports the insertion of the differential gear which is preassembled together with the drive bevel gear, into the axle housing by way of the assembly opening of the axle housing extending transversely to the bearing axis does not entail any difficulties—notwithstanding the fact that this opening has to be dimensioned very small by reason of the required housing rigidity—because the large interior width of the bearing openings offers prior to the insertion of the bearing sleeves sufficient freedom of movement for the assembly-inclined positions of the bearing necks relative to the bearing axis. The bearing sleeves and the means for the sealing and fastening thereof with respect to the axle housing, however, represent a considerable structural expenditure.

The present invention is therefore concerned with the task essentially to reduce these structural expenditures.

The underlying problems are solved in an advantageous manner according to the present invention in that the outer race of at least one of the roller bearings inserted directly into its bearing opening as is also enlarged in its outer diameter compared to the corresponding standard diameter.

At least the one bearing sleeve or bearing cage is economized by the present invention without having to enlarge the assembly opening or increase the width of the axle housing in the direction of the bearing axis in order to be able to introduce the differential gear. The freedom of movement of the assembly-inclined positions of the differential gear is assured as heretofore, by the large interior width of the bearing opening attained as a result of the increased outer diameter of the outer race.

In the bearing support according to the present invention, a threaded ring screwed into the bearing opening or a support flange screwed onto the axle housing may serve as abutment for the support of the enlarged outer race in the direction of the bearing axis pointing away from the differential gear. The structural expenditure for this support is particularly low if a retaining ring inserted into a groove of the bearing opening is used as abutment.

In order to avoid expansion of the axle housing under the influence of the tooth forces at the bevel gear, the axle housing may be placed under prestress in the directions of the bearing axis. For purposes of producing the prestress, it is advantageous in the bearing support according to the present invention that a spacer ring is arranged between an enlarged outer race and its abutment. The axle housing is thereby selectively expanded or spread apart and is retained under prestress by the insertion of a spacer ring with the requisite ring width.

In the bearing support according to the present invention, provision may be made by reason of the higher loading capability of the outer race as a result of its enlarged cross section that pocket-shaped recesses in the wall of the axle housing start from the housing inner mouth of one or both bearing openings. These pocket-shaped recesses—which, as such, reduce the supporting surface of the bearing opening for the outer race and which would entail an unacceptable breakage danger for an outer race with normal outer diameter—facilitate the tilting-in or tipping-in of the differential gear out of the inclined position, which it must assume during the introduction into the axle housing by way of the assembly opening, into the assembled position aligned with the bearing axis.

In the bearing support according to the present invention with a threaded ring or with a support flange as abutment for the one enlarged outer race, the expanding of the axle housing for applying the prestress takes place in such a manner that the differential gear housing at first is supported in one direction of the bearing axis by way of the abutment of the other outer race. In the case of the threaded ring, a housing expansion results by way of the differential gear housing, if the threaded ring is further screwed into the bearing opening, after it is brought into abutment with its outer race. The same procedure will be followed in the case of the support flange. An expanding or spreading apart of the housing occurs in that case when screwing on the support flange, if care is taken for the fact that the spacing of the outer race—when the support flange is brought into abutment at the latter—has a smaller distance with respect to the abutment surface of the axle housing cooperating with the support flange than with respect to the abutment surface of the support flange cooperating with the axle housing.

In the bearing support according to the present invention, in which both outer races are enlarged and supported by way of a retaining ring, it is advantageous for facilitating the assembly of the differential gear to provide for an expansion of the axle housing by application of a prestress at the grooves provided for the retaining rings before the differential gear and the outer races are inserted. One must similarly take care of the fact that the differential gear prior to the insertion into the axle housing is completely preassembled together with its drive bevel gear as well as the inner race together with the cage of the associated roller bearing carrying the roller bodies mounted or fitted on each bearing neck. Under these prerequisites one may now so proceed that the preassembled structural unit of differential gear, drive bevel gear, inner races and cages together with roller bodies is so introduced into the axle housing by way of the assembly opening of the axle housing extending transversely to the bearing axis that the axis of the bearing necks is aligned with the bearing axis. As further assembly step, the outer races are then inserted into the bearing openings after the introduction of the preassembled structural unit into the axle housing and are brought into abutment with the roller members. The preassembled structural unit together with the outer races can now be brought into the position for the correct tooth clearance between the drive bevel gear and its associated pinion.

For purposes of determining the oversize of the distance of the retaining rings, by which the axle housing is expanded or spread apart for the creation of the prestress, a further assembly step is provided, according to which in the position for the correct tooth clearance the actual distance between an outer race and the support edge of the groove for the associated retaining ring is determined in the unstressed condition of the axle housing. The axle housing after the determination of the actual distances can now be spread apart or expanded in the directions of the bearing axis.

For purposes of fixing the aforementioned oversize, spacer rings may be inserted into the expanded axle housing, whose respective thickness, together with the thickness of the associated retaining ring is larger than the actual distance. However, in economizing the spacer rings, provision may also be made that retaining rings are inserted into the expanded axle housing whose respective thickness is larger than the actual distance.

Since the assembly opening extends transversely to the bearing axis, the axle housing may be expanded by expanding of the assembly opening.

In adaptation to the expanding method by way of the differential gear housing by the axial components of the screw forces of the threaded ring or of the support flange, one may also so proceed in the bearing support according to the present invention, in which both outer races are supported by way of a retaining ring, that the enlarged outer race is supported at one bearing neck by way of its retaining ring, inserted into the associated groove and the expanding of the axle housing takes place by a displacement of the other bearing neck relative to the associated bearing opening thereof. The insertion of the retaining ring after the expanding is thereby facilitated in that an expanding tool serving for the displacement of the other bearing neck cooperates with a pressure member by way of springy means, by way of which the retaining ring of the outer race supporting this other bearing neck is adapted to be introduced into its groove.

Accordingly, it is an object of the present invention to provide a bearing support of a differential gear in an undivided axle housing and a method of assembling the same, which avoid by simple means the aforementioned shortcomings and drawbacks encountered in the prior art.

Another object of the present invention resides in a bearing support of a differential gear in an undivided axle housing which dispenses with considerable structural expenditures represented by the need for bearing sleeves as well as sealing and fastening means required heretofore.

A further object of the present invention resides in a bearing support for a differential gear in an undivided axle housing and in a method for assembling and installing the same, which entail considerable savings by the elimination of structural expenditures, required in connection with the prior art constructions and assemblies.

A still further object of the present invention resides in a bearing support for a differential gear in an undivided axle housing in which the support for the bearing, especially for the outer race thereof is particularly simple in construction.

Another object of the present invention resides in a bearing support for the differential gear within an undivided axle housing, in which distortions of the axle housing under the influence of tooth forces can be effectively avoided.

A still further object of the present invention resides in a bearing support for a differential gear in an undivided axle housing which minimizes danger of failures due to excessive stresses in the housing parts without incurring additional structural expenditures.

These and other objects, features and advantages of the present invention will become more apparent from the following description when taken in connection with the accompanying drawing, which shows, for purposes of illustration only, several embodiments in accordance with the present invention and wherein:

FIG. 1 is a cross-sectional view through a first embodiment of a bearing support of a differential gear according to the present invention in which the outer races of both roller bearings are enlarged in diameter and are supported at a respective retaining ring which is increased in its thickness for purposes of maintaining a prestress of the axle housing produced by expanding the assembly opening of the axle housing;

Figure 1:
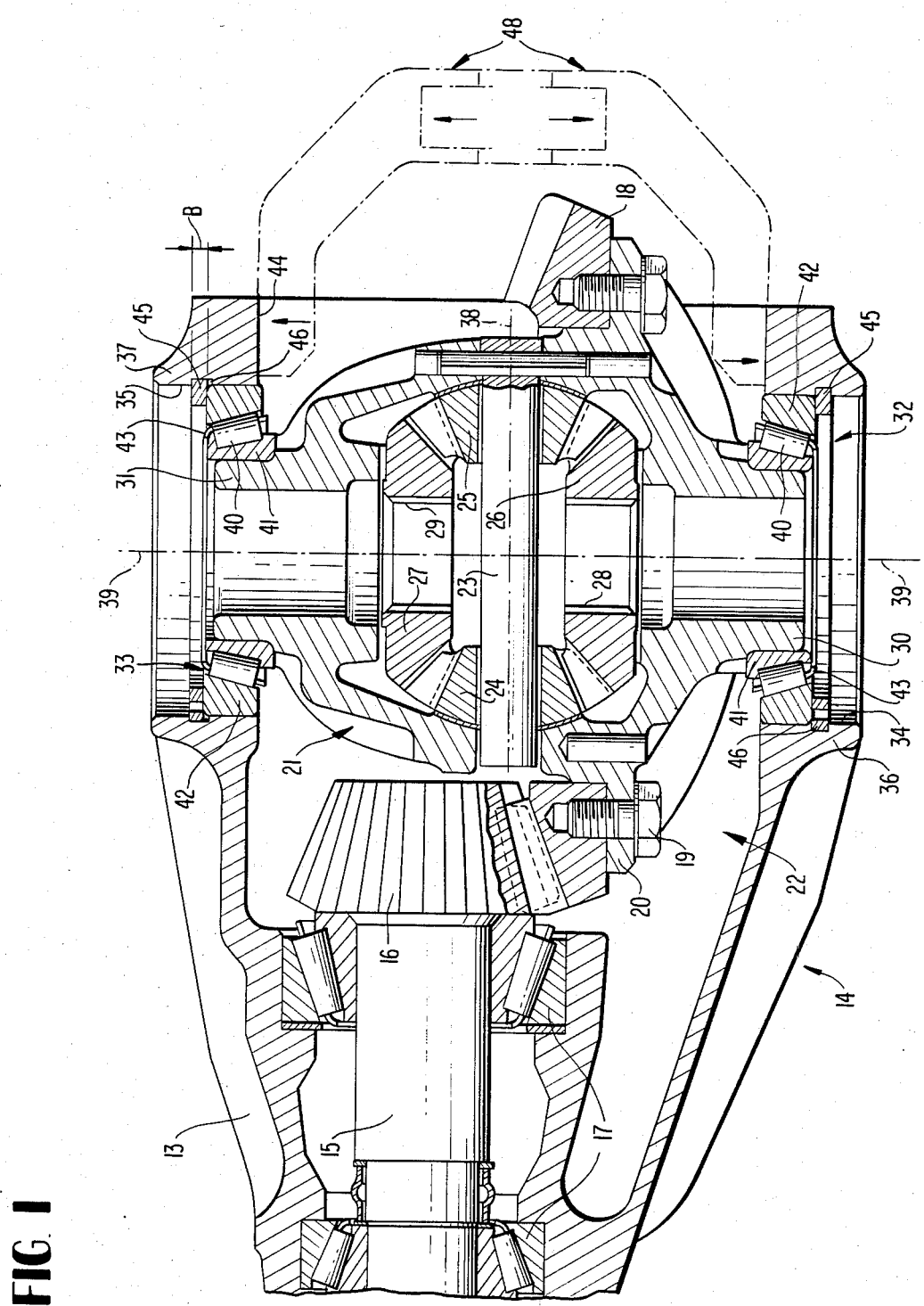
Figure 8:
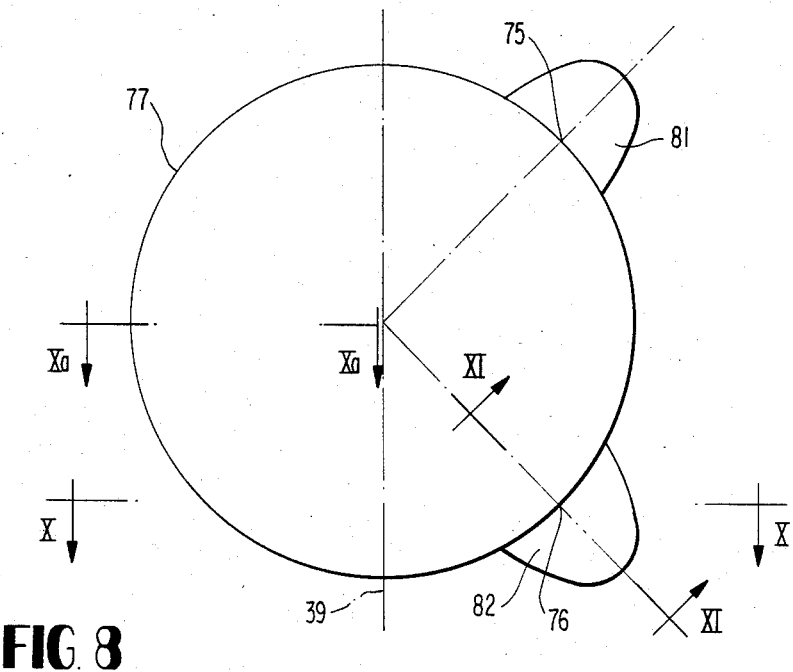
FIG. 8 is a somewhat schematic elevational view of a bearing opening of the axle housing of FIG. 1, taken in the direction of arrow VIII in FIG. 7.
Figure 9:
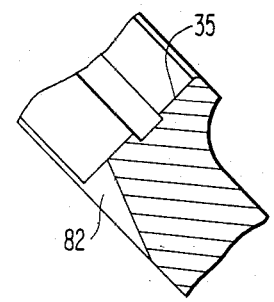
FIG. 9 is a cross-sectional view through the axle housing of FIG. 1, taken along line IX—IX of FIG. 8.
Figure 10:
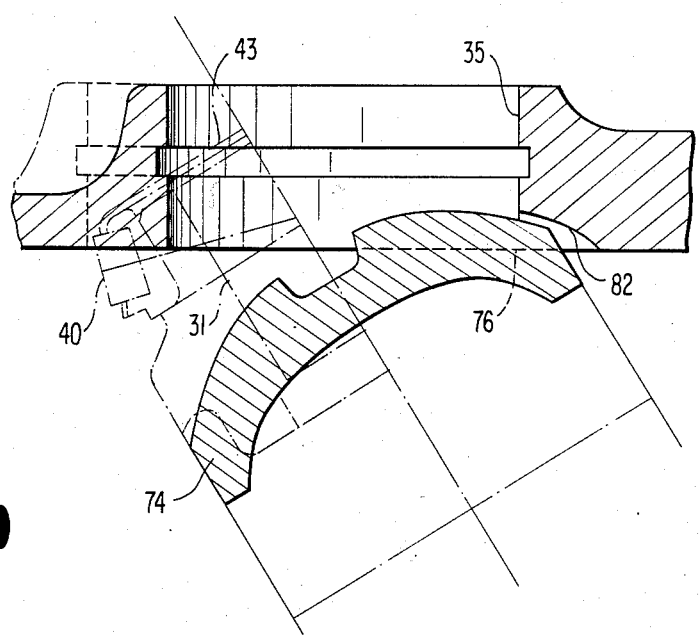
Figure 7:
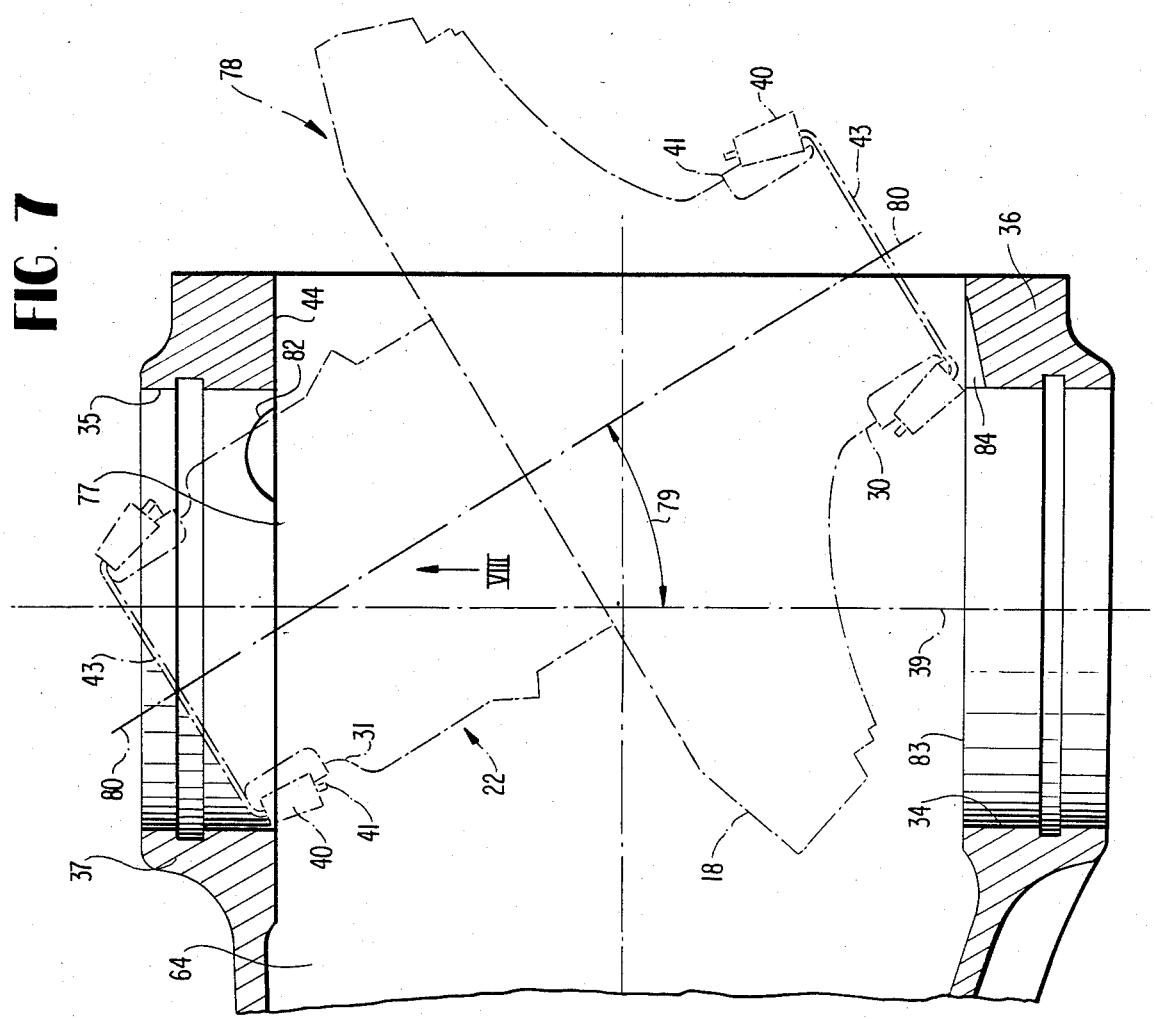
FIG. 7 is a cross-sectional view through the axle housing of FIG. 1 with a schematic illustration in dash and dotted lines of an inclined position of the differential gear during the assembly operation.
Figure 4:
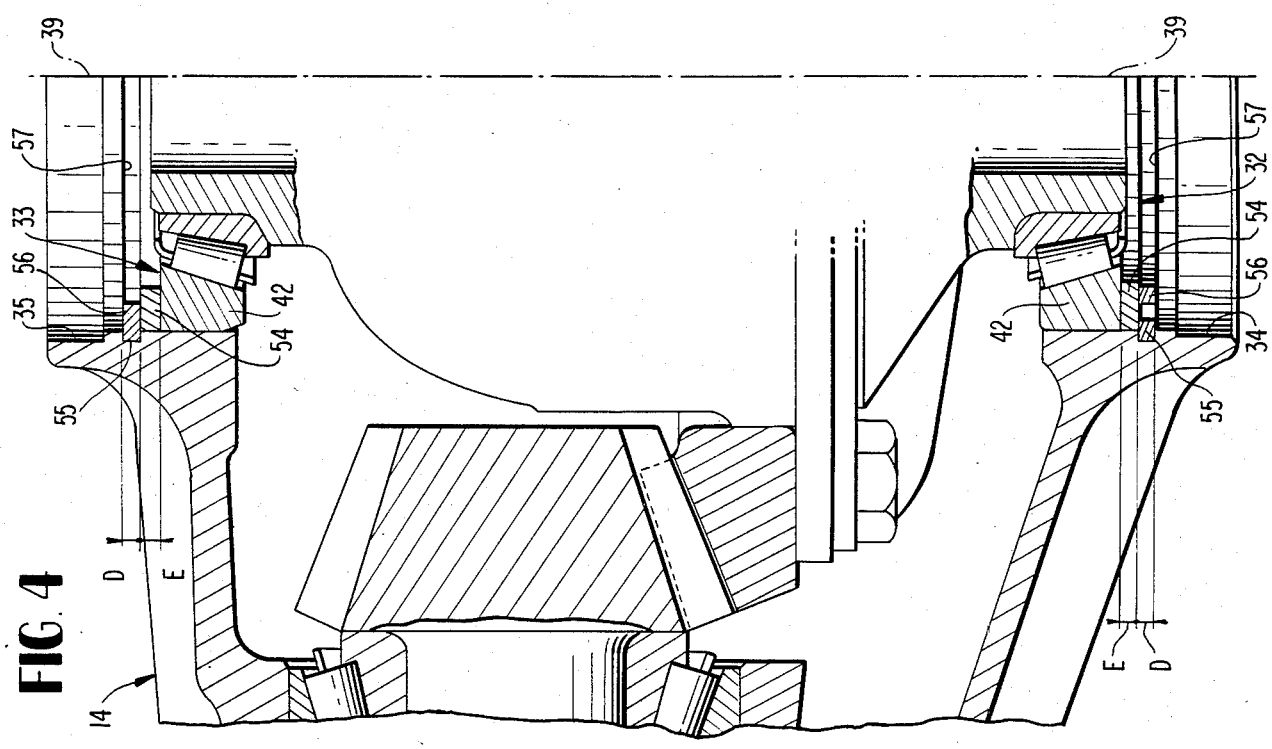
FIG. 4 is a cross-sectional view through still another modified embodiment of a mounting support in accordance with the present invention, in which both outer races are supported each by way of a spacer ring at a retaining ring.
Figure 6:
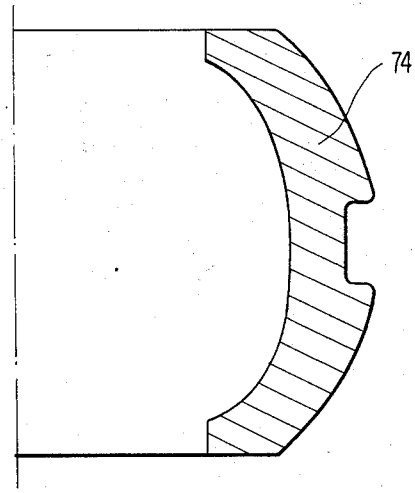
FIG. 6 is a cross-sectional view through the differential gear housing of FIG. 1, taken along line VI—VI of FIG. 5.
Figure 12:
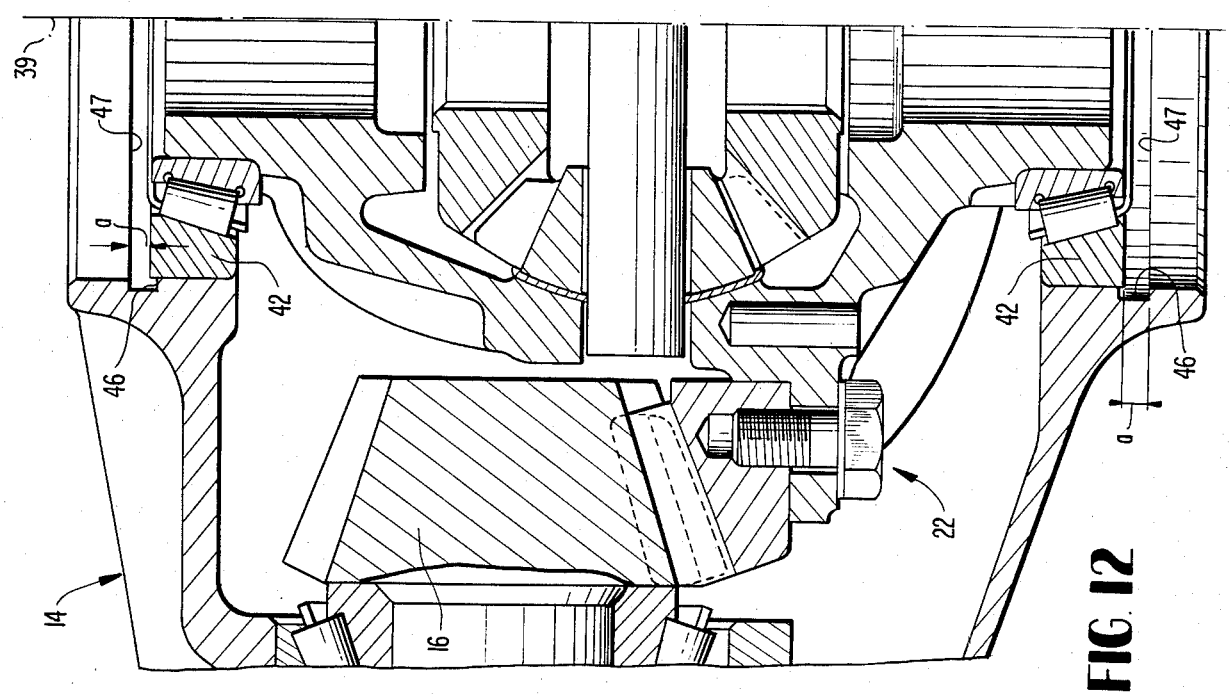
Figure 11:
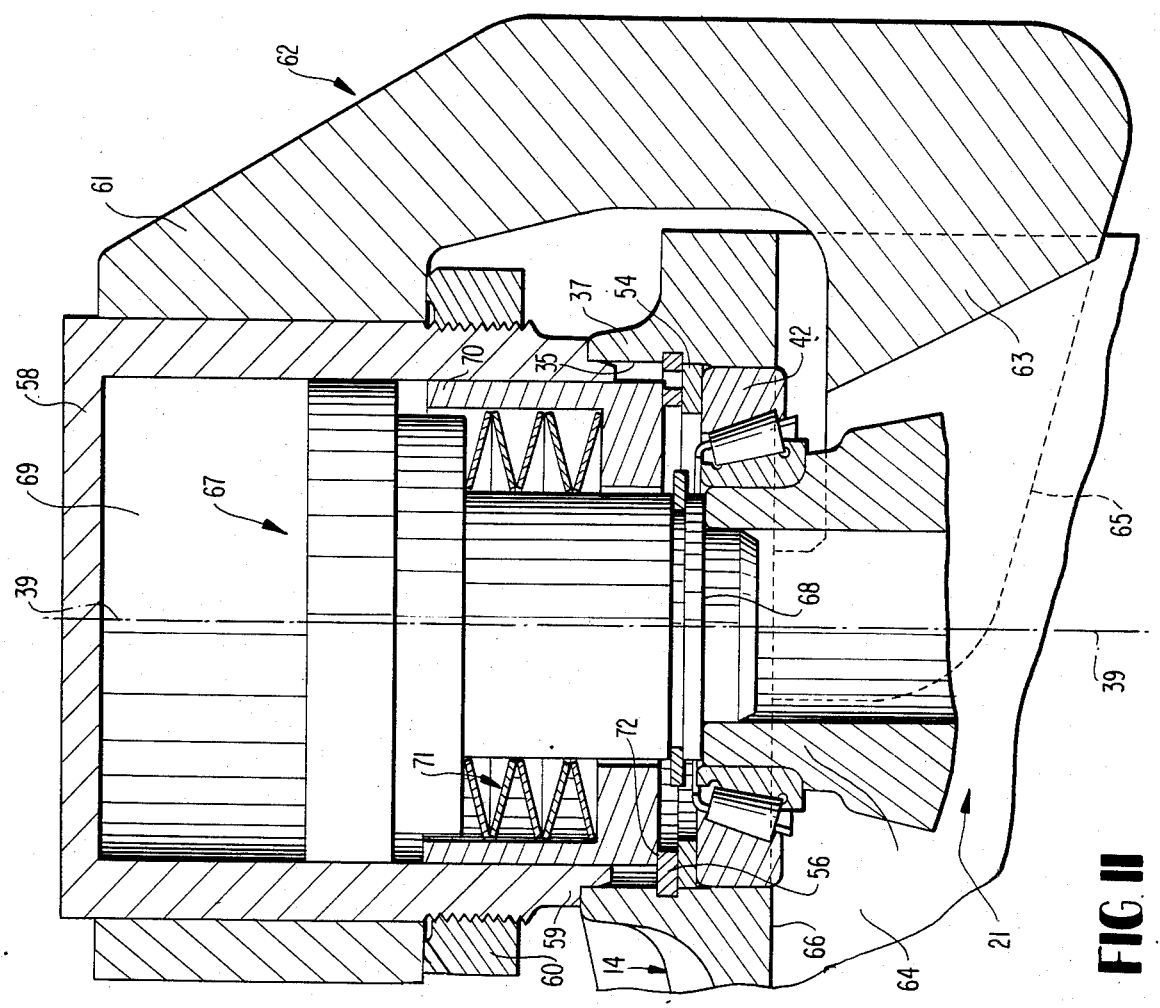

FIG. 10 is a cross-sectional view through the axle housing and the differential gear of FIG. 1 in the inclined position illustrated in FIG. 7 relative to one another in which the axle housing is illustrated in cross section, shown in full line according to line X—X of FIG. 8 and in cross section shown in dash and dotted lines according to line Xa—Xa of FIG. 8 and the differential gear is illustrated in cross section shown in full lines corresponding to that of FIG. 6 and in a cross section shown in dash and dotted lines corresponding to the line Xa—Xa of FIG. 8;

FIG. 11 is a cross-sectional view illustrating the expanding operation for enlarging the axle housing in the embodiment of FIG. 4, utilizing an expanding tool in accordance with the present invention; and FIG. 12 is a cross-sectional view of the position of the outer races and of the differential gear for the correct tooth clearance prior to the expanding of the axle housing in the embodiment of FIG. 1.

Referring now to the drawing wherein like reference numerals are used throughout the various views to designate like parts, and more particularly to FIG. 1, the shaft 15 of a drive pinion 16 is rotatably supported in a longitudinal section 13 of an axle housing generally designated by reference numeral 14 by means of a pair of tapered roller bearings 17. The drive pinion 16 is in meshing engagement with a bevel gear 18 which is secured by way of screws 19 at a flange 20 of a differential gear housing generally designated by reference numeral 21 of a differential gear generally designated by reference numeral 22. Two differential bevel gears 24 and 25 which are rotatably supported on a bearing pin 23 immovable with respect to the differential gear housing 21, engage with two axle-shaft bevel gears 26 and 27. The axle shaft bevel gears 26 and 27 are each provided with a splined hub profile 28 and 29 for their non-rotatable connection with a driving half-shaft (not shown) possibly under interconnection of a joint.

The differential gear housing 21 includes two bearing necks 30 and 31 aligned with respect to one another, which are supported each by way of a respective conical or tapered roller bearing generally designated by reference numerals 32 and 33 in a bearing opening 34 and 35 of a bearing eye 36 and 37 of the axle housing 14. The tapered roller bearings 32 and 33 have approximately equal short spacings with respect to the plane 38 of the axis of rotation of the differential bevel gears 24 and 25, as a result of which the axle housing 14 can be constructed short in the directions of the bearing axis 39.

Whereas the tapered roller members 40 and the inner races 41 of the tapered roller bearings 32 and 33 correspond to the standard dimensions, the outer races 42 of the two tapered roller bearings 32 and 33 are enlarged in their outer diameter compared to the standard outer diameter as well as are inserted directly into the associated bearing opening 34 and 35. In this manner, an additional bearing sleeve between the outer race and the bearing opening is avoided and the latter is dimensioned so large in its inner clear width that the introduction and insertion of the differential gear 21 completely preassembled together with the bevel gear 18, the inner races 41 and the tapered roller members 40 inclusive the respective cage 43 is assured by way of the usual assembly opening 44, without having to enlarge the latter with respect to an assembly opening in a known, prior art bearing support having bearing sleeves between the outer race and the bearing opening. Such an enlargement would impair the ridity of the axle housing in an undesired manner.

The four embodiments of FIGS. 1 to 4 are identical as regards the arrangement described above.

In the embodiment of FIG. 1, the outer races 42 are each directly supported at a retaining ring 45 which is inserted into a groove 46 of the respective bearing opening 34 and 35.

The bearing support according to FIG. 1 is illustrated in FIG. 12 in that assembly phase prior to the insertion of the retaining rings 45, in which the outer races 42 together with the differential gear 22 have been brought in the directions of the bearing axis 39 into the position for the correct tooth play between drive pinion 16 and the bevel gear 18. In this position, the actual distance a between the respective outer race 42 and the support edge 47 of its retaining ring 45 on the side of the housing is determined. Thereupon—in order to place the axle housing 14 under prestress—the assembly opening 44 is spread apart or expanded by means of an expanding tool 48, indicated in FIG. 1 in dash and dot lines, whereby the axle housing 14 will expand in the directions of the bearing axis 39. Finally, retaining rings 45—whose width B are larger by an oversize corresponding to the desired housing prestress than the actual distance a (FIG. 12)—are inserted into the associated groove 46.

Figure 2:
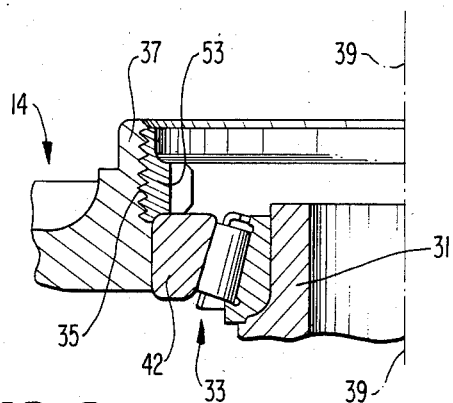
FIG. 2 is a partial longitudinal cross-sectional view of a modified embodiment of a bearing support according to the present invention in which the enlarged outer race of one roller bearing is supported at a threaded ring screwed into the bearing opening.

In the embodiment of FIG. 2, the outer race 42 of the tapered roller bearing 33 is directly supported at a threaded ring 53 which is screwed into the bearing opening 35. When the threaded ring 53, after its abutment at the outer race 42, is further screwed into the bearing opening 35, a relative displacement between bearing eye 37 and bearing neck 31 takes place in the directions of the bearing axis 39 so that the axle housing 14 is adapted to be placed under prestress in this manner. The other bearing neck 30 (not shown), in contrast thereto, remains immovable with respect to its associated bearing eye 36 during the explained relative displacement.

Figure 3:
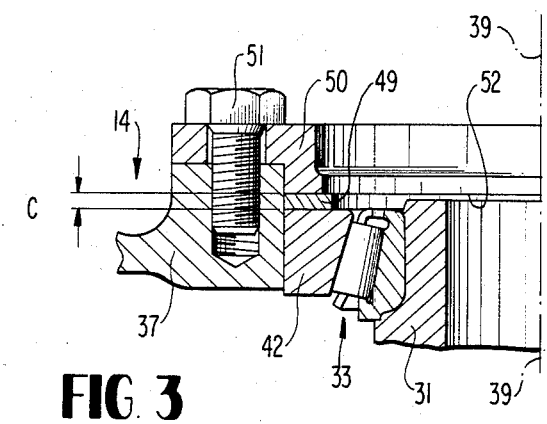
FIG. 3 is a partial cross-sectional view through a still further modified embodiment of a bearing support in accordance with the present invention, in which the enlarged outer race is supported by way of a spacer ring at a support flange screwed on the axle housing.

In the embodiment of FIG. 3, the outer race 42 of the tapered roller bearing 33 is supported at a support flange 50 under interposition of a spacer ring 49, which support flange is screwed onto the bearing eye 37 by means of screws 51. In that case, the axle housing 14 is placed under prestress in the directions of the bearing axis 39 while being expanded in that the width C of the spacer ring 49 is selected larger by the corresponding oversize than the actual distance between the outer race 42 and the support surface 52 at the support flange 50 with an unstressed axle housing and screwed-on support flange. Also, in this embodiment, the other bearing neck 30 (not shown) remains immovable relative to its bearing eye 36, when the bearing neck 31 is displaced in the directions of the bearing axis 39 by tightening the screws 51 relative to its bearing eye 37.

In the embodiment of FIG. 4, the outer races 42 of both tapered roller bearings 32 and 33 are supported each under interposition of a spacer ring 54 at a retaining ring 56 inserted into a groove 55 of the associated bearing opening 34 and 35. The sum of the width E of the respective spacer ring 54 and of the width D of the associated retaining ring 56 is larger by the oversize corresponding to the desired housing prestress than the actual distance of the corresponding outer race 42 with respect to the support edge 57 of the associated retaining ring 56 on the side of the housing with an unstressed axle housing 14. The expanding of the axle housing 14 in the directions of the bearing axis 39 for the insertion of the spacer and retaining rings 54 and 56 can take place in the manner described by reference to FIG. 1, by expanding the assembly opening 44.

In the embodiment of FIG. 1, the support of the outer race 42 at the tapered roller bearing 32 could also take place corresponding to the support according to one embodiment of FIGS. 2 to 4.

In the embodiment of FIG. 2, the support of the outer race of the non-illustrated tapered roller bearing 32 could also be realized either exactly as the illustrated support for the tapered roller bearing 33 or corresponding to the support according to one of the embodiments of FIGS. 1, 3, and 4.

In the embodiment of FIG. 3, the support of the outer race of the non-illustrated tapered roller bearing 32 could also be constructed either exactly as the illustrated support for the tapered roller bearing 33 or corresponding to the support according to one of the embodiments of FIGS. 1, 2 and 4.

Finally, in the embodiment of FIG. 4, the support of the outer race 42 of the tapered roller bearing 32 could be constructed corresponding to the support according to one of the embodiments of FIGS. 1, 2 and 3.

A method is illustrated in FIG. 11 in order to expand the axle housing 14 in the embodiment of FIG. 4 and place the same under prestress by relative displacement in the directions of the bearing axis 39 of the bearing neck 31 with respect to the associated bearing eye 37. The other bearing neck 30 (not shown) is thereby immovably supported with respect to the bearing eye 36 by way of the associated retaining ring 56. A pot-shaped pressure cylinder 58 is centered with its open end 59 in the bearing opening 35 and is supported by way of a threaded ring 60 with respect to the arm 61 of a bow-shaped counter support generally designated by reference numeral 62. The other arm 63 of the counter support 62 extends through the assembly opening 44 and projects into the interior space 64 of the axle housing 14. The arm 63 is provided with two sections 65 arranged mutually offset perpendicularly to the cross-sectional plane of FIG. 11, which extend over the differential gear housing 21 from above or from below and are supported at the inner wall 66 of the axle housing 14 in the one direction of the bearing axis 39. A pressure piston generally designated by reference numeral 67 which is guided in the pressure cylinder 58 in a pressure-tight and displaceable manner, is supported and centered with its outer end 68 at the bearing neck 31. The bearing neck 31 and therewith the other bearing eye 36 (not shown) is displaced with respect to the bearing eye 37 by a pressure increase in the working pressure chamber 69 of the pressure cylinder 58 enclosed by the pressure piston 67 and thus the axle housing 14 is expanded. A pressure member 70 which is constructed in the manner of an annular piston, is displaceably guided in the outer end 59 of the pressure cylinder 58, which pressure member is supported against the pressure piston 67 by way of a set of cup springs generally designated by reference numeral 71. The outer end face of the pressure member 70 serves as abutment surface 72 for the retaining ring 56. In this manner, the outer race 42, the spacer ring 54 and the retaining ring 56 are guidingly displaced by the pressure member 70 and are thereby brought into their respective assembly positions.

Figure 5:
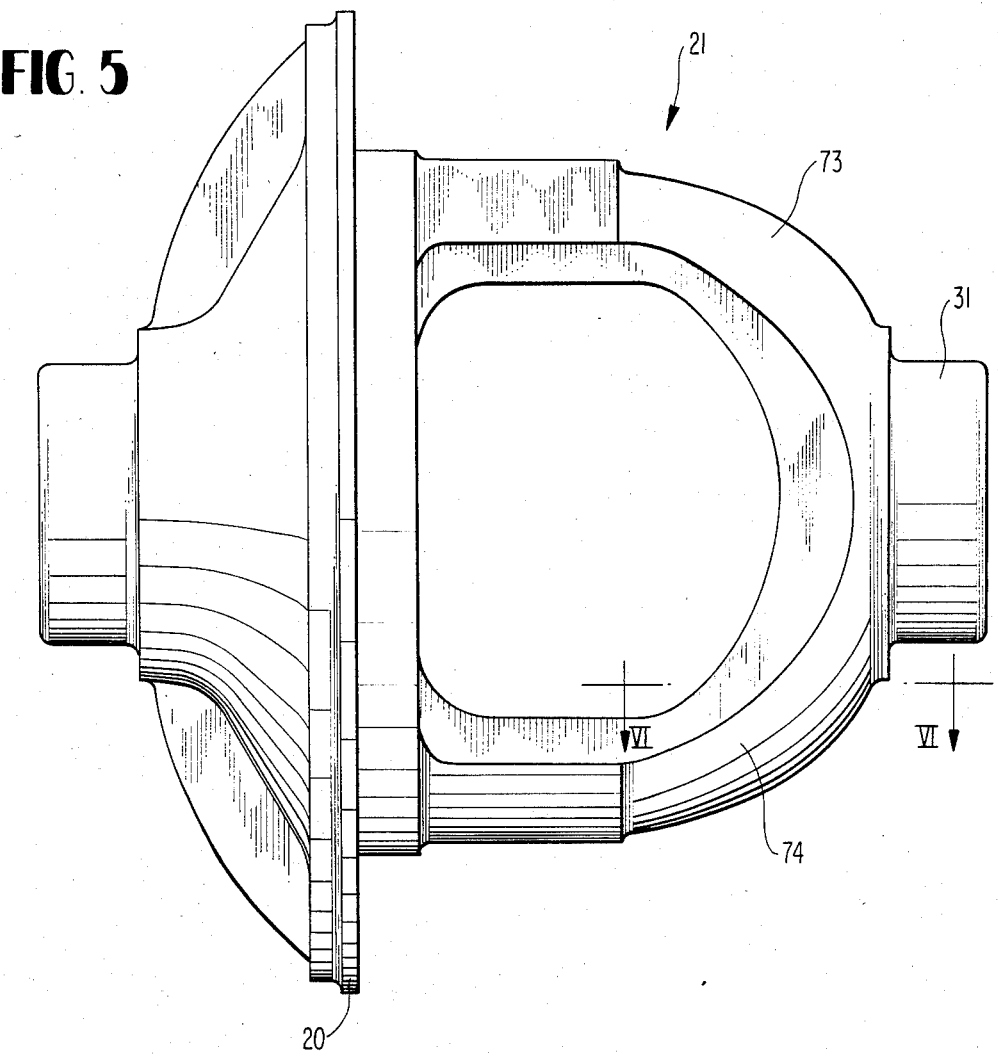
FIG. 5 is a plan view of the differential gear housing of FIG. 1, rotated through 90°.

As can be seen from the illustration of FIGS. 5 and 6, the flange 20 of the differential gear housing 21 is connected with the bearing neck 31 by diametrically opposite disposed, semi-ring-shaped web sections 73 and 74—whose cross-sectional shapes are shown in FIG. 6. These web sections 73 and 74 abut at the places 75 and 76 (FIGS. 8 and 10) of the mouth 77 of the bearing opening 35 disposed in the housing interior space 64 when the preassembled structural unit 78 consisting of differential gear 22, bevel gear 18, inner races 41, tapered roller members 40 and cages 43 is introduced into the housing interior space 64 corresponding to FIG. 7 by way of the assembly opening 44—whose width corresponds approximately only to the outer diameter of the bevel gear 18—and is brought thereat into an inclined position 79 which can be seen from FIG. 7, in relation to the bearing axis 39 and the axis 80 of the bearing necks 30 and 31 and is to be tipped out of this inclined position with its bearing necks into the bearing openings 34 and 35. As such, this abutment could be avoided in that one assembles the tapered roller members 40 with their cages 43 and possibly also the inner races 41 only after the tipping-in operation when the axes 39 and 80 are aligned. However, difficulties would then result during the disassembly of these parts. According to the present invention, pocket-shaped recesses 81 and 82 are now provided at the places 75 and 76 of the mouth 77, by means of which an abutment of the web sections 73 and 74 at the mouth 77 of the bearing opening 35 is avoided. A further improvement of the ease and free movability for the tipping-in operation is additionally achieved in that a pocket-shaped recess 84 is also provided at the housing inner mouth 83 of the bearing opening 34 in order to facilitate the tilting-in of the bearing neck 30 into this bearing opening.

As can be seen clearly from FIG. 7, it is attained by the present invention that the width of the assembly opening 44 in the plane of this figure is considerably smaller than the outer diameter of the bevel gear 18. As a result thereof, the distance of the bearings 32 and 33 and therewith the corresponding width of the axle housing could be kept very small. The width of the assembly opening, required for the passage of the bevel gear 18, extends according to the present invention perpendicularly to the plane of FIG. 7.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. Bearing apparatus for a differential gear housing with a ring gear attached thereto and meshing with a drive pinion having an axis of rotation which axis is arranged perpendicularly to a bearing axis of rotation, and with differential gears, contained therein in a bevel gear construction mode in a one-piece axle gear housing, two antifriction bearings arranged on the axis of rotation of the differential gears on both sides of the differential gears, wherein outer races of the antifriction bearings are supported in mutually aligned bearing eyes developed as part of the axle gear housing and are supported thereat by way of fixed abutments, the inner races of the antifriction bearings being seated on bearing necks of the differential gear housing and being supported on collars facing away from the differential gear housing, wherein the differential gear housing, the ring gear, the differential gears, the inner races mounted each on one of the bearing necks, and an associated cage which guides the antifriction bearings can be inserted as a preassembled module in the axle gear housing by way of a mounting aperture, which aperture is located in the axle gear housing facing away from the drive pinion, the axis of the aperture extending at right angles to the bearing axis and in the same direction as the axis of a shaft carrying the drive pinion, securing ring means inserted in grooves of the bearing eyes as abutments for transmitting a prestressing force resulting from spreading the axle gear housing in the directions of the axle bearing from the axle gear housing to the antifriction bearings, pocket-like recess means formed on an inner wall of one or both bearing eyes of the axle gear housing for admitting the preassembled module to the axle housing;

the two antifriction bearings being disposed substantially the same distance to the axis of rotation of the drive pinion; and the preassembled module also contains the inside bearing race and cage of other antifriction bearings.

2. Bearing apparatus for spreading apart the axle gear housing of a bearing having a differential gear housing with a ring gear attached thereto and meshing with a drive pinion having an axis of rotation which pinion is arranged perpendicularly to a bearing axis having an axis of rotation, and with differential gears contained therein in a bevel gear construction mode in a one-piece axle gear housing, two antifriction bearings arranged on the axis of rotation of differential gears on both sides of the differential gears, wherein outer races of the antifriction bearings are supported in mutually aligned bearing eyes developed as part of the axle gear housing and are supported thereat by way of fixed abutments, the inner races of the antifriction bearings being seated on bearing necks of the differential gear housing and being supported on collars facing away from the differential gear housing, wherein the differential gear housing, the ring gear, the differential gears, the inner races mounted each on one of the bearing necks, and an associated cage which guides the antifriction bearings can be inserted as a preassembled module in the axle gear housing by way of a mounting aperture, which aperture is located in the axle gear housing facing away from the drive pinion, the axis of the aperture extending at right angles to the bearing axis and in the same direction as the axis of a shaft carrying the drive pinion, and where the two antifriction bearings, by means of supports, are held under an initial bearing stress resulting from spreading of the axle housing in a direction of the axis of the bearing, and where the bearing eyes and the axle housing are developed in one part wherein securing rings inserted in grooves of the bearing eyes serve as abutments; pocket-like recesses are formed on an inner wall of one or both bearing eyes of the axle gear housing;

the two antifriction bearings have the same distance to the axis of rotation of the drive pinion; and the preassembled constructional unit also contains the inside bearing race and cage of the other antifriction bearings, further comprising a spreading apparatus having a pressure medium servo cylinder, supportable with one of its ends against an end of a bearing eye on the outside of the axle housing, which accommodates a pressure medium servo piston movable in the direction of the bearing axis with a plunger attached to this piston and supportable in the associated bearing neck, this pressure medium servo cylinder being connected with a counter holder exhibiting a supporting arm, which latter can be introduced into the mounting aperture and can be supported against an end of the bearing eye on the inside of the axle housing.

3. Bearing apparatus according to claim 2, wherein the servo cylinder is centered on the bearing eye, and the plunger is centered on the bearing neck, this plunger being arranged coaxially to the bearing axis.

4. Bearing apparatus according to one of claims 2 or 3 wherein the spreading apparatus further comprises a pressure ring and at least one compression spring are arranged between the servo piston and an abutment.

5. Bearing apparatus according to claim 2, wherein the pressure ring is centered in the servo cylinder.

6. Bearing apparatus according to claim 3, wherein the pressure ring is centered in the servo cylinder.

7. Bearing apparatus according to claim 4, characterized in that the pressure ring is centered in the servo cylinder.

* * * * *